Jan. 31, 1961 F. E. DRUMMOND 2,970,124
PLASTIC CEMENT COMPOSITION FOR LIGHTWEIGHT CERAMIC TILE
Original Filed Oct. 14, 1953
2 Sheets-Sheet 1
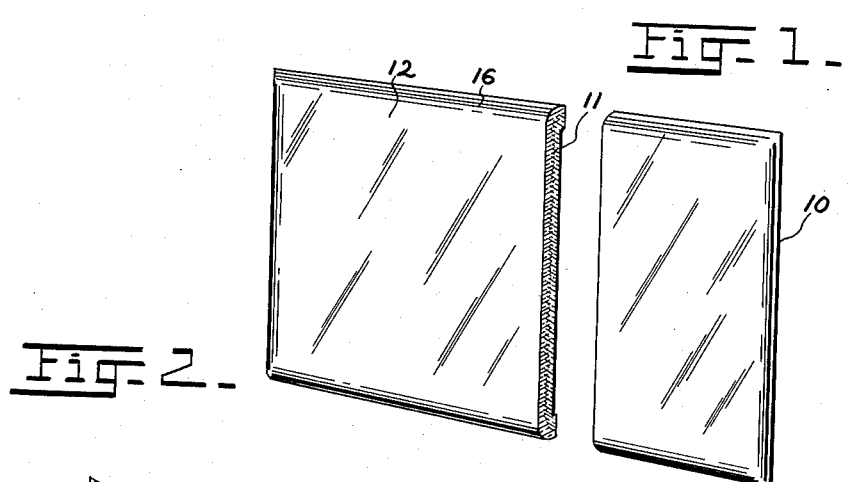
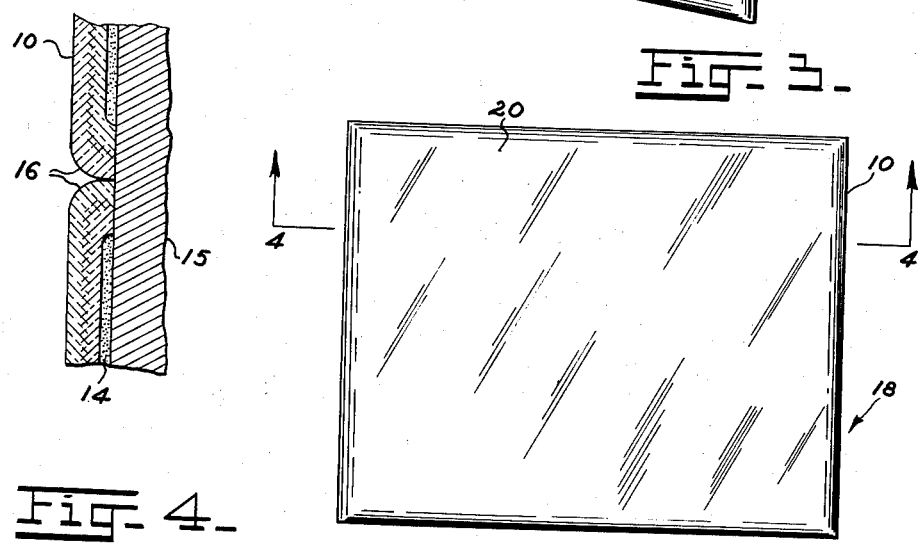
INVENTOR
FOLSOM E. DRUMMOND
BY
ATTORNEYS Jan. 31, 1961 F. E. DRUMMOND 2,970,124
PLASTIC CEMENT COMPOSITION FOR LIGHTWEIGHT CERAMIC TILE
Original Filed Oct. 14, 1953
2 Sheets-Sheet 2
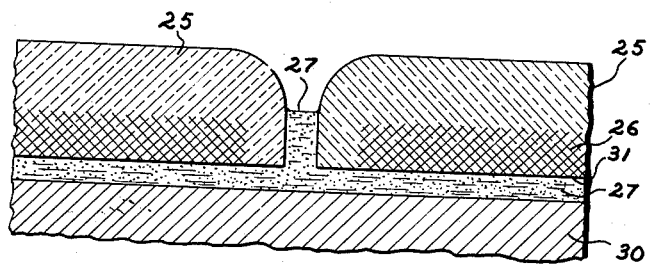
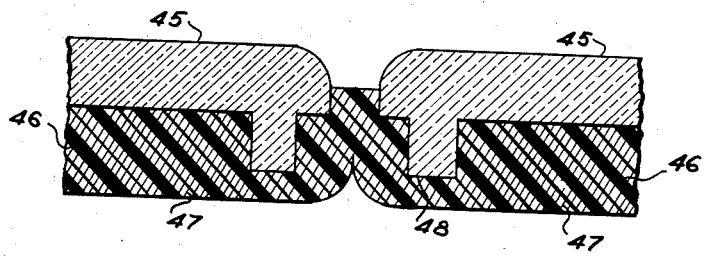
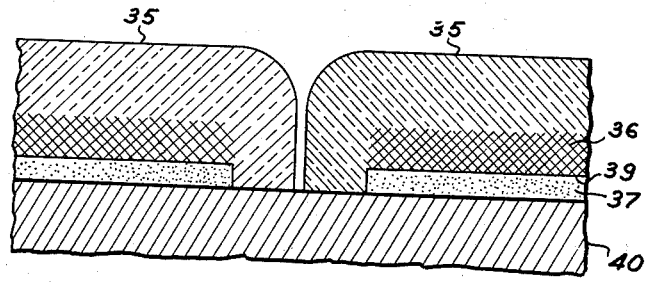
INVENTOR
FOLSOM E. DRUMMOND
BY Toulmin & Toulmin
ATTORNEY United States Patent Office 2,970,124
Patented Jan. 31, 1961

2,970,124
PLASTIC CEMENT COMPOSITION FOR LIGHT-WEIGHT CERAMIC TILE

Folsom E. Drummond, Washington, D.C.

Original application Oct. 14, 1953, Ser. No. 385,955. Divided and this application Aug. 24, 1954, Ser. No. 451,868

2 Claims. (Cl. 260—23)

This invention relates to improvements in surface coverings and particularly to ceramic tiles.

The prior art discloses that it is known to provide various types of facing materials, such as wall or floor tiles, which have been made of plastic, light-weight metal, or other suitable materials as a substitute for ceramic tiles. These plastic and light metal wall covering materials generally have been used in place of ceramic tiles. While plastic tiles and light-weight metal coverings have been employed for decorating walls and the like, such wall coverings are not as durable or attractive as ceramic tiling.

Plastic shapes and plastic coated metal coverings, as well known, are relatively easily scratched and marred, as compared to ceramic tiles, which is a disadvantage. They also tend to become discolored upon ageing and when subjected to moisture and varying temperature conditions encountered in use. These disadvantages and undesirable characteristics of plastic wall coverings are avoided when use is made of ceramic or vitreous tiles. The fused clay surface of ceramic tiles provides a porcelain-like wear-resistant surface which is very durable. On the other hand, the weight and higher cost of ceramic tiles and their difficulty of application to surfaces have heretofore largely mitigated against their use except where cost is not a factor for consideration.

It is accordingly a principal object of this invention to provide a ceramic tile for aplication as a wall or floor covering and which is of light weight and easy to apply to a base structure.

A further object of this invention is to provide a surface-covering article, such as wall tile or the like, which can be aplied to a surface to be decorated by unskilled labor such as a home owner or one having no particular knowledge of cements or ceramic tiling.

Another object of this invention is to provide a surface covering of the character described which can be applied to a surface without the necessity of utilizing a separate cement or mastic.

Another object of the invention is to provide a surface-covering article, such as wall or floor tile, which is of light weight and wherein the requisite amount of adhesive or bonding mastic is already applied thereto, whereby it is not necessary to obtain separate cement or special adhesive for the insulation of the tiling.

Another object of the invention is to provide an improved ceramic tile which comprises a relatively thin ceramic fused coating which is interlocked with a base of glass fibers so as to form a ceramic tile which is of very light weight but is strong structurally.

Another object of the invention is to provide a surface-covering article of the character described wherein the cement or bonding mastic utilized for cementing the tiles to the surface to be decorated comprises a plastic resinous cement containing glass fibers and wherein the cement is flexible.

Another object is to provide a novel plastic cement for use in bonding tiles or the like wall or floor coverings in place.

Still another object is to provide a cement for securing tiles and the like in place, which cement comprises glass fibers as a principal constituent.

Other objects and advantages of the invention will become apparent from the following description taken in conjunction with the drawings, in which:

Figure 1 is a view in perspective and partly broken away showing a tile member composed of ceramic material and glass fibers interlocked and fused to form a ceramic tile;

Figure 2 is an enlarged fragmentary view in cross-section showing a wall portion decorated with tiling such as illustrated in Figure 1, and showing the manner of mounting the same on the supporting wall surface;

Figure 3 is a plan view of a wall tile such as illustrated in Figure 1 and carrying an underlying cement or adhesive layer for cementing the tile onto a supporting surface, the cement having a protective sheet disposed thereover which is normally tacky and pressure-sensitive;

Figure 4 is a cross-sectional view of the tile as shown in Figure 1, and taken on line 4—4;

Figure 5 is an enlarged fragmentary cross-section view similar as Figure 2 and illustrating a further modification of a wall tiling and its application;

Figure 6 is a similar view as Figure 5 and showing an enlarged fragmentary cross-sectional view of a tiled wall portion wherein the cement or plastic adhesive material is applied only to the back of the tile and not in between the adjacent abutting tiles, and Figure 7 is a fragmentary sectional view illustrating a modification of the tile structure and fabrication shown in Figure 5.

The light weight ceramic tile of the present invention comprises an interlocking laminar structure in which the outermost layer is generally flat, rigid ceramic clay fused to a backing layer of glass fibers. The thickness of the glass fiber layer or base of the tile is sufficient to give the ceramic tile strength and prevent chipping or cracking of the outer ceramic layer.

The ceramic body of the tile may be made of the usual ceramic constituents of such tiles as, for example, a mixture of shales, clays or clay with or without coloring oxides. In order to produce colored tiles there is introduced into the clay or mixture of clay and shale, coloring oxides such as oxides of cobalt, uranium, iron, manganese, chromium, titanium, etc. The mixture of clay and coloring oxides is fed into a pug mill and mixed, then passed through a de-airing chamber, then pressed out into the desired shapes, and then dried and fired to fuse the clay and form a vitreous ceramic tile. The wet clay or ceramic mass is pressed into the mass of glass fibers, which glass fibers are in the form of a mat or layer, and which readily receive the wet or plastic ceramic mixture.

The mastic or pressure-sensitive cementitious material used to permanently bond the tile to a surface to be decorated is preferably one which is flexible and which retains its adhesive and resilient properties during use and does not become brittle and easily fractured.

A suitable tacky mastic pressure-sensitive adhesive and one which may be applied directly to the back of the tile as illustrated in Figure 3, comprising a mixture of castor oil and filler, for example whiting (calcium carbonate) and powdered white resin, using about equal parts by weight of each of the ingredients.

Other suitable setting cements may be used for bonding the tile, such as a mixture of resin and hydraulic cements, the constituents being added in the proportionate amount to produce a yieldable or resilient bonding cement. The synthetic resin is preferably one which is thermoplastic, as aforementioned. It should be water-resistant, elastic, and firmly grip both the wall or floor structure and glass fiber backing of the tile. A suitable resinous cement containing water glass consists of a polystyrene resin emulsion of morpholine oleate and chlorinated diphenyl plasticizer admixed with sodium silicate, the latter comprising up to about 60% of the resin. The morpholine oleate and chlorinated diphenyl plasticizer comprises about 10–15% by weight of the total composition and the resin comprises the remainder.

The silicate increases the working time of the composition and maintains the same in sufficient fluidity to cover and interlock with the glass fibrous mass and any fillers which may be incorporated to form a tenacious mastic cement.

Other resins suitable for bonding the tiles and glass fibers may be used, particularly those of the thermoplastic type, for example, polyvinyl acetate, polyvinyl chloride, copolymers of vinyl chloride-vinyl acetate, polyvinyl alcohol acetal, polystyrene, chlorinated rubbers, styrene polymers and copolymers, cellulose acetate, cellulose acetate butyrate, cellulose acetate propionate, methyl cellulose, vinyl butyrate, polyethylene, butadiene copolymers, methyl methacrylate, vinyl acetate polymers, vinyl chloride-vinylidene chloride copolymers and mixtures of these substances. Vinyl resins are illustrated graphically by the following structural formulas:

Polyvinyl acetate:

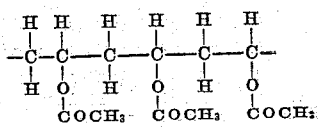

Polyvinyl chloride:

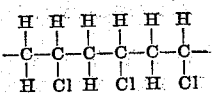

Copolymer vinyl chloride-vinyl acetate:

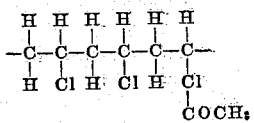

Polystyrene:

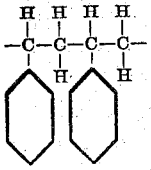

Polymethyl acrylate:

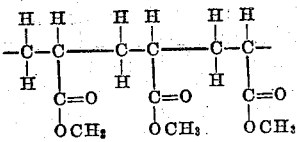

Polymethyl methacrylate:

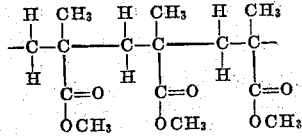

Polyvinyl alcohol acetal:

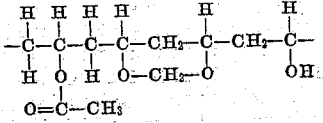

The copolymer vinyl resins which contain both vinyl chloride and vinyl acetate are particularly useful as a flexible resin, one which retains its color and is water and chemical resistant. The copolymer vinyl chloride-vinyl acetate resin provides a very useful cementitious coating because it is chemically inert at ordinary temperature and is unaffected by strong or weak acids or by strong or weak alkalines. Further, the copolymer vinyl resin is insoluble in petroleum carbons and is not affected by alcohol, grease or water.

Other colorless flexible resins such as acryloid resins may also be used or suitable combinations of the acryloid resins with nitrocellulose or cellulose acetate since this resin and mixture with nitrocellulose retains its color when exposed to sunlight and has excellent adhesive properties. Moreover, these resins are water-white and are elastic similarly as rubber and resistant to water, alcohol, acid, mineral oils, greases, fumes, vegetable oil and animal fats.

In a preferred resinous composition wherein the plastic cement comprises glass fibers, the resin used preferably is a copolymer vinyl resin. Such a resin is preferred because on porous and rough surfaces, such as concrete, cast iron and the like, it is possible to get sufficient adhesion by mechanical anchorage of the film of cement so that baking is unnecessary. Utilizing vinyl resins the solvents usually employed are ketones, such as methyl and ethyl ketones, e.g., acetone. A mixture of solvents, such as methyl isobutyl ketone-toluene is especially useful with copolymer vinyl resins. As a plasticizer for the resin dibutyl phthalate, tricresyl phosphate, and the like, may be added. Other plasticizers such as phthalic diester of monobutyl ether of ethylene glycol, dibutoxy ethyl phthalate and methoxy ethyl acetyl ricinolate may be employed.

In order to produce an elastic adhesive cement, the proportion of solvent and plasticizer and glass fiber, when present, may be varied, depending upon the desired consistency of the cement and physical condition of the surface upon which the cement is applied.

The addition of fillers, such as whiting as aforementioned, barytes, carbon black, metal oxides and the like, may be made to produce a cement having the desired color and body. Generally, the ceramic tile is of one color and the cement or mortar therebetween is of a contrasting color. Where a pressure-sensitive cement or adhesive mastic is applied to the back of the tile, the color of the cement is usually not of importance.

In preparing a resinous-glass fiber cement or mastic for bonding the tile to a wall or the like surface, the composition may consist of the following typical mixture:

| | Part by wt. |
|---|---|
| Vinyl chloride-acetate copolymer | 25–75 |
| Dibutyl phthalate | 10–20 |
| Whiting | 5–10 |
| Castor oil | 2–5 |
| Methyl ethyl ketone | 15–40 |

The copolymer used in this instance consists of 85% by weight of vinyl chloride and 15% by weight vinyl acetate. Dibutyl phthalate is used as a plasticizer. Other plasticizers may be substituted therefor, e.g., diethylhexyl phthalate or the like, as aforementioned.

To the above plastic resinous cement is introduced glass fibers in the proportion from between about 10% to 30% by weight of the plastic resinous cement, the proportionate amount of glass fibers introduced depending to some extent upon the particle size of the fibers and desired plasticity of the cement.

Glass fibers of small diameter are preferred, e.g., 1 micron and lower because they possess a higher tensile strength per square inch than larger diameter fibers. Fibers having a diameter of 0.1 micron are preferred but they may range from 0.05 to 1.5 microns. Larger diameter glass fibers also may be used where high tensile strength is not a factor. The glass fibers reinforce the resinous binder and strengthen it, rendering it more resilient and adherent to the wall and tile surfaces. The plastic glass fiber cement is made to interlock with the ceramic tile and firmly hold the same to the wall or supporting surface.

Referring now to the drawings, there is illustrated in Figure 1 a ceramic tile constructed in accordance with this invention. The tile comprises an outer ceramic, fused clay surface 10 and having a backing or under-surface 11 which comprises glass fibers. The layer 11 of glass fibers is made up in the form of a mat and the mixture of clay and ceramic material in wet or pug condition is pressed into the layer of glass fibers. Thereafter the interlocked layers of ceramic material and glass fibers is subjected to baking and fusing of the clay to form the tile. The outer surface 12 of the tile generally presents a glazed, smooth surface such as illustrated in Figure 1.

In a tile structure as shown in Figures 1 and 2, the plastic cement, as shown at 14 in Figure 2, is used to unite the tile to the wall surface 15. As illustrated, the outer surface of the tile is preferably glazed or vitrified ceramic material similarly as fired clay products. The curved edges 16 of the tile also consist of vitreous or ceramic material, with the under-surface or backing being composed of glass fibers felted or matted together forming a porous fibrous layer 11, as illustrated in Figure 2.

In the modification shown in Figures 3 and 4, the tile 18 is of similar shape as that shown in Figure 1, the outer surface portion or shell being composed of fused clay or ceramic material 20. Interlocked with this ceramic layer is a glass fibers layer 21. For bonding the tile to its supporting surface a cement 22 is applied to the under-surface of the tile, as illustrated in Figure 4. In order to protect the mastic or tacky pressure-sensitive cement 22 there is applied thereover a covering, such as a paper sheet 23. The protective sheet preferably is coated with a water-soluble gum on the surface which contacts the cement to facilitate its removal. Wax paper may also be used as a protective covering sheet.

The paper covering 23 is removed from the tile when the same is to be applied to the supporting wall or floor surface. It becomes necessary then merely to press the adhesive tacky cement back of the tile against the supporting surface and allow the same to dry.

In Figure 5 there is shown a modified tiling structure wherein the ceramic tile 25, constructed as shown and described in Figure 1, and having a glass fiber base layer 26, is laid in a flexible or plastic cement layer 27. The cement preferably comprises a resin-glass fibrous mixture as heretofore described. This cement adheres tenaciously to the supporting surface 30 and interlocks with the glass fibrous under-layer, as shown at 31 on the ceramic tile.

In the further modification illustrated in Figure 6, the ceramic tile 35, having the glass fibrous base layer 36, and constructed similarly as the tile shown in Figures 3 and 4, is provided with a pressure-sensitive adhesive cement layer 37 on the underside thereof. This tacky adhesive layer is applied to the underside of the tile and readily engages and interlocks with the glass fibers exposed at the base portion 39 of the ceramic tile which is laid on the wall or floor surface 40.

The tile structure illustrated in Figure 7 comprises a vitreous or glazed ceramic tile 45 embedded in a resilient layer of plastic material 46. This plastic layer 46 functions as a cushion between the ceramic tile and its supporting surface and compensates for any expansion and contraction characteristic differential therebetween. The plastic mass 46 comprises a mixture of glass fibers 47 and resin, the glass fibers constituting preferably about 20 to 50% by weight of the plastic, and such as to provide a hard, tough but flexible bonding material for tenaciously retaining the tile to a supporting surface, such as a wall or floor.

In the preferred tile construction, the same comprises an inwardly projecting abutment or peripheral flange 48 which increases the surface area of the tile in contact with the resinous-glass fiber plastic 46. The tile portion 48 is thus firmly embedded in and interlocked with the resin-glass fiber plastic. If desired, the abutment 48 may be shaped in the form of lugs or separate projections spaced around the underside of the tile and forming an integral part thereof.

By providing the ceramic tile with an exposed under-surface layer of glass fibers which are partially fused together or in the form of a mat, as illustrated in the drawings, the plastic cement which is applied thereto is mechanically anchored and interlocked with the base or underside of the ceramic tile and is thus bonded to the wall surface.

Where the weight of the ceramic tile becomes an important factor, and it is desired to keep the weight as low as possible, the amount of ceramic clay or vitreous material is reduced so that a thin shell of the ceramic material is formed over the surface and the remainder of the tile comprises principally glass fibers in the form of a mat which is interlocked with the outer shell of the tile. In this manner a very lightweight ceramic tile may be provided, one which is strong and tough and can be readily bonded to a wall supporting surface.

Although the invention has been particularly described with respect to a tile having a fused or vitrified clay surface, it will be understood that this glazed surface may be accomplished by utilizing a mixture of glass fiber and vitrifiable material, such as shale, clay, etc. Also, sheets of the tiling material may be made of blocks of two or more to form a tile-like structure. Further, by employing a tile of the character described, wherein the tile carries its own bonding cement, the tacky surface of which is protected by a temporary covering, the messy and tedious application of separate adhesive mastic from a separate container to the surface to be tiled, as required heretofore, is entirely eliminated. Advantageous use is made of plastic cements containing glass fibers to provide a cementitious material which is tough and resilient and clings tenaciously to the tile and wall surfaces.

As aforementioned, the cement may be formed of resin alone or mixed with other compatible film-forming substances such as nitrocellulose, cellulose esters, rosin and natural resins suitably plasticized. The mastic or cement as applied to the back of the tile also may comprise a mixture of polyvinyl chloride-acetate resin and ordinary cement such as Portlant cement. Such a mixture wherein the resin comprises about 10 to 25% by weight of the cement provides a suitable cement which retains its plasticity and does not become brittle and pull away from the base surfaces upon which it is applied.

The invention has been described with particular emphasis on wall and floor tiled surfaces, but it will be apparent that the principles of the invention are equally applicable to other types of surfaces which are adapted to receive such covering tile or article. Further, tiles of the present invention may be used for preparing signs, plaques and displays such as used in windows and advertising. Moreover, this surface-covering material and tiles of the present invention may be of other shapes than that shown and may have printed or other decorations formed in the surface, as desired.

It will further be understood that various other modifications and changes and substitutions of equivalents may be made in the construction and arrangement of the tile and tiled surfaces and which are within the scope of the invention as defined in the appended claims.

This application is a division of my application Serial No. 385,955, filed October 14, 1953.

I claim:

1. A resinous water-resistant, resilient, plastic cement for bonding lightweight ceramic tile to a supporting surface, said plastic cement consisting of the following composition:

| | Parts by weight |
|---|---|
| Vinyl chloride-vinyl acetate copolymer resin | 25-75 |
| Dibutyl phthalate | 10-20 |
| Whiting (calcium carbonate) | 5-10 |
| Castor oil | 2-5 |
| Methyl ethyl ketone | 15-40 |
| Glass fibers | 10-30 | said copolymer resin consisting of 85% vinyl chloride units and 15% vinyl acetate units, and said glass fibers having a diameter of about 0.1 micron and of a length to provide a plastic resinous cement.

2. A resinous water-resistant, resilient, plastic cement for bonding ceramic tile to a supporting surface, said plastic cement comprising the following constituents by weight, a copolymer resin consisting of 85% vinyl chloride units and 15% vinyl acetate units, said copolymer resin constituting 25-75 parts of said plastic cement, dibutyl phthalate plasticizer 10 to 20 parts, castor oil 2 to 5 parts, whiting (calcium carbonate) 5 to 10 parts, methyl ethyl ketone 15 to 40 parts, and glass fibers from 10 to 30% by weight of the plastic resinous cement, and wherein the glass fibers have a diameter of from 0.05 to 1.5 microns and are of a particle size to provide a cement of plastic consistency.

References Cited in the file of this patent

UNITED STATES PATENTS

| | | |
|---|---|---|
| 2,018,805 | Reisig | Oct. 29, 1935 |
| 2,176,837 | Ellis | Oct. 17, 1939 |
| 2,311,233 | Jaenicke et al. | Feb. 16, 1943 |
| 2,430,987 | Lindner et al. | Nov. 18, 1947 |
| 2,446,119 | White et al. | July 27, 1948 |
| 2,486,756 | Murphy et al. | Nov. 1, 1949 |
| 2,507,688 | Armstrong | May 16, 1950 |
| 2,618,959 | Watkins | Nov. 28, 1952 |
| 2,625,498 | Koch | Jan. 13, 1953 |
| 2,688,774 | Malinowski et al. | Sept. 14, 1954 |
| 2,692,220 | Labino | Oct. 19, 1954 |
| 2,718,829 | Seymour | Sept. 27, 1955 |
| 2,751,962 | Drummond | June 26, 1956 |

FOREIGN PATENTS

| | | |
|---|---|---|
| 537,583 | Great Britain | 1941 |

OTHER REFERENCES

"Concrete," pages 12 and 45, June 1949.
Bacon et al.: India Rubber World, vol. 125, No. 3, pages 323-24, December 1951.
Powell et al.: Modern Plastics, vol. 28, No. 10, pages 129-140, June 1951.
Chemical Abstracts, vol. 39, column 10821, 1945.
De Marco: Plastic Industry, pages 19-23, August 1951.